(12) United States Patent
Corma et al.

(10) Patent No.: US 8,901,364 B2
(45) Date of Patent: *Dec. 2, 2014

(54) ALKENE OLIGOMERIZATION PROCESS

(75) Inventors: Avelino Corma, Valencia (ES); Cristina Martinez, Valencia (ES); Eric J. Doskocil, Oswego, IL (US); George Yaluris, Park Ridge, IL (US)

(73) Assignee: BP Corporation North America Inc., Houston, TX (US)

( * ) Notice: Subject to any disclaimer, the term of this patent is extended or adjusted under 35 U.S.C. 154(b) by 67 days.
This patent is subject to a terminal disclaimer.

(21) Appl. No.: 13/377,959

(22) PCT Filed: Jun. 22, 2010

(86) PCT No.: PCT/US2010/039410
§ 371 (c)(1),
(2), (4) Date: Mar. 28, 2012

(87) PCT Pub. No.: WO2011/002631
PCT Pub. Date: Jan. 6, 2011

(65) Prior Publication Data
US 2012/0178981 A1 Jul. 12, 2012

(30) Foreign Application Priority Data
Jul. 3, 2009 (EP) ..................................... 09380130

(51) Int. Cl.
*C07C 2/12* (2006.01)
*B01J 29/70* (2006.01)
*B01J 29/06* (2006.01)
*B01J 35/10* (2006.01)
*C10G 50/00* (2006.01)
*C10L 1/08* (2006.01)

(52) U.S. Cl.
CPC .............. *B01J 29/7042* (2013.01); *B01J 29/06* (2013.01); *B01J 35/1061* (2013.01); *C10G 50/00* (2013.01); *C10L 1/08* (2013.01); *B01J 2229/16* (2013.01); *B01J 2229/22* (2013.01); *B01J 2229/38* (2013.01); *C10G 2400/04* (2013.01); *C10G 2300/4018* (2013.01); *C10G 2300/1088* (2013.01); *C10G 2300/70* (2013.01)

USPC ........... 585/533; 585/502; 585/520; 585/530; 585/532; 502/77; 502/85; 502/86

(58) Field of Classification Search
USPC ......... 585/502, 510, 516, 520, 530, 532, 533; 502/77, 85, 86
See application file for complete search history.

(56) References Cited

U.S. PATENT DOCUMENTS 4,675,460 A * 6/1987 Seddon et al. ................ 585/329
4,876,411 A * 10/1989 Bowes et al. ................ 585/533

(Continued)

OTHER PUBLICATIONS

"Framework Type MTW" in Database of Zeolite Structures, available at www.iza-structure.org, accessed Jun. 18, 2013.*

(Continued)

*Primary Examiner* — In Suk Bullock
*Assistant Examiner* — Bradley Etherton
(74) *Attorney, Agent, or Firm* — Kelly L. Cummings

(57) ABSTRACT

Disclosed is a process for producing a hydrocarbon fraction rich in components boiling in the range typical for diesel fuel comprising contacting a feedstock comprising one or more $C_2$ to $C_{10}$ alkenes with a modified zeolite catalyst having a one-dimensional micropore structure consisting of channels made from rings containing between 8 and 12 silicon/aluminum atoms at a temperature in the range 100 to 500° C. and pressure in the range 0.1 to 200 bar characterized in that the modified zeolite catalyst is one which has been prepared by treating a corresponding zeolite precursor with an alkaline solution. The alkaline solution used to treat the zeolite precursor can be for example aqueous sodium hydroxide solution. Relative to equivalent untreated zeolites the modified zeolite catalysts described show improved catalyst life and selectivity to hydrocarbons boiling in the range 250 to 350° C.

12 Claims, 4 Drawing Sheets

(56) References Cited

U.S. PATENT DOCUMENTS

Figure 1:
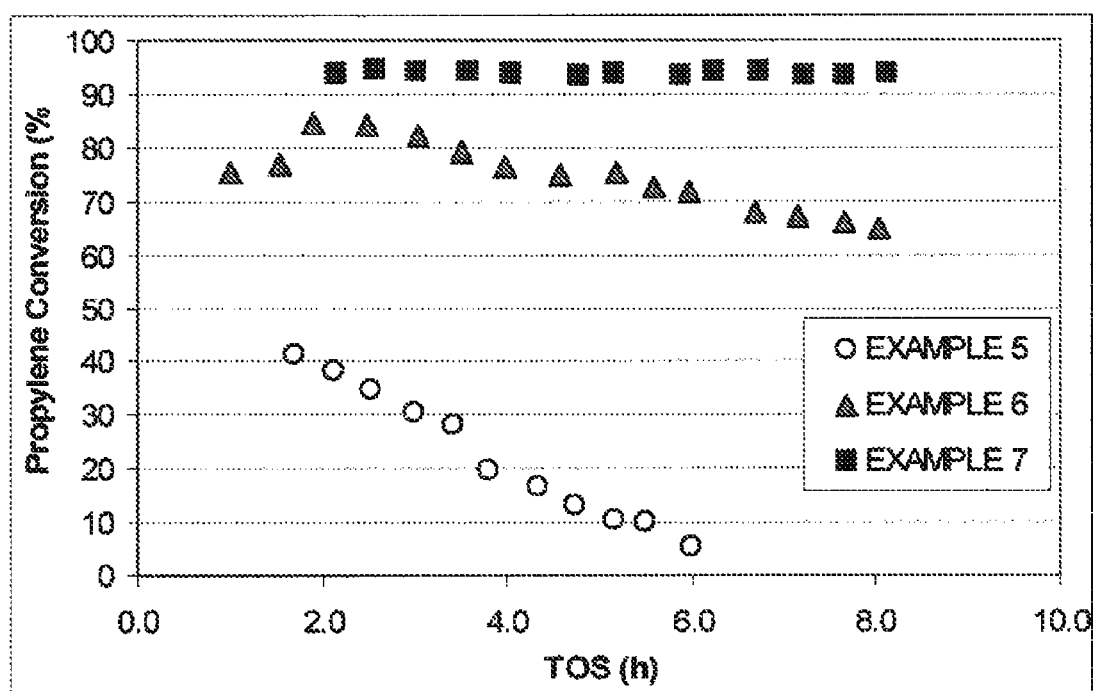

| | | | | |
|---|---|---|---|---|
| 5,080,878 | A | * | 1/1992 | Bowes et al. ................. 423/713 |
| 5,284,989 | A | * | 2/1994 | Apelian et al. ................ 585/533 |
| 5,625,104 | A | * | 4/1997 | Beck et al. .................... 585/475 |
| 7,425,662 | B2 | * | 9/2008 | Stanat et al. .................. 585/533 |
| 2008/0139860 | A1 | * | 6/2008 | Simon et al. .................. 585/530 |

OTHER PUBLICATIONS

"Framework Type MFI" in Database of Zeolite Structures, available at www.iza-structure.org, accessed Jun. 18, 2013.*

"Framework Type TON" in Database of Zeolite Structures, available at www.iza-structure.org, accessed Jun. 18, 2013.*

"Framework Type FER" in Database of Zeolite Structures, available at www.iza-structure.org, accessed Jun. 18, 2013.*

Speight, "Refinery Processes" in Kirk-Othmer Encyclopedia of Chemical Technology, J. Wiley & Sons, 1996, p. 433-469.*

Groen et al., On the Introduction of Intracrystalline Mesoporosity in Zeolites Upon Desilication in Alkaline Medium, Microporous and Mesoporous Materials 69. (2004), pp. 29-34.

International Search Report corresponding to PCT Patent Application No. PCT/US2010/039410, dated Feb. 1, 2011.

Xiao Qiang, et al. "Characterization and Catalytic Performance of Alkali-Treated Mordenite for Synthesis of Ethyl Tertiary Butyl Ether," Institute of New Catalytic Material Science, College of Chemistry, Nankai University, Tianjin 300071, China, p. 243 (Abstract), Jun. 25, 2004.

\* cited by examiner

Naphtha: C5-446.9 K
Diesel: 446.9-664.1 K
Heavy fraction: 664.1-1273 K

Naphtha: C5-446.9 K
Diesel: 446.9-664.1 K
Heavy fraction: 664.1-1273 K

ALKENE OLIGOMERIZATION PROCESS

This application is the U.S. National Phase under 35 U.S.C. 371 of International Application PCT/US10/39410 filed on Jun. 22, 2010, which claims priority to European Application No. 09380130.6, filed on Jul. 3, 2009, which is incorporated herein by reference.

The present invention relates to a heterogeneous process for oligomerizing alkenes to produce a hydrocarbon fraction suitable for use as diesel fuel. In particular the present invention relates to process which employs as catalyst a zeolite treated with alkaline solution.

The oligomerization of light alkenes, such as propene and butenes, represents an important industrial route to the production of environmentally friendly synthetic liquid fuels, free of sulphur and aromatics. These processes allow the production of olefinic mixtures in the boiling range of gasoline or diesel depending on the exact nature of the catalyst and its operating conditions. For example it is known that high temperatures (>300° C.) and low pressures (≤30 bar) will increase the gasoline yield, whereas lower temperatures and higher pressures will favour the formation of heavier oligomers in the diesel fraction.

The oligomerization of lower alkenes into a diesel range product is typically acid catalysed through a reaction mechanism which is thought to involve highly reactive carbenium ions which generate both liner and branched hydrocarbon products. In order to obtain a high quality product however the degree of branching needs to be restricted. Two strategies have been suggested in the art to achieve this: control and modification of the site of catalysis in the catalyst (e.g. the strength of its acidity or the nature of its local environment), and use of particular zeolite catalysts whose micropore structure confers "shape selectivity", on the oligomerization process thereby influencing the relative kinetics of straight and branched chain growth.

Medium pore zeolites of the pentasil type have been described as suitable for obtaining high quality middle distillates with minimal branching. For example U.S. Pat. No. 4,227,992 and U.S. Pat. No. 4,211,640 teach zeolite ZSM-11 as a catalyst for olefin oligomerization processes, and mention others such as ZSM12, ZSM-21 and TEA mordenite. GB2106131 and GB2106533 discloses the use of ZSM-5 and ZSM-11 for oligomerization of gaseous olefins and teaches that a selectivity of 25 wt % to a diesel product with cetane index of 75 can be obtained when the hydrogen form of the zeolite is used. U.S. Pat. No. 5,234,875 discloses a coked ZSM-23 yielding a considerably less branched product than its unmodified counterpart. In U.S. Pat. No. 5,284,989 three medium pore zeolites, ZSM-22, -23 and -35, were treated with a dicarboxylic acid to inactivate their surface acidity with the aim of producing substantially linear hydrocarbons by oligomerizing propylene. Several patents (WO95/19945; WO95/22516; U.S. Pat. No. 6,143,942) claim the use of different medium pore zeolites, such as ZSM-22, ZSM-57, ZSM-5, alone or in admixtures, to oligomerize light olefins and in WO93/082780 a ZSM-23 zeolite treated with collidine exhibited to deactivate 25-30% of the acid sites showed a reduction in branching in the product.

FR2887538A1 describes the use of different zeolites, MEL, ITH, MFI, NES, EUO, ERI, FER, CHA, MFS, MWW, MTT, TON and MOR, which have been first dealuminated in a first step followed by treatment with a silicon compound and finally converted to the hydrogen form.

FR2894850A1 describes the use of modified MEL, ITH, MFI, NES, EUO, ERI, FER, CHA, MFS, MWW, MTT, TON and MOR zeolites as catalysts in an oligomerization process to obtain diesel or jet fuel. The catalysts are prepared by impregnating the zeolite with Group VIB and VIII metals followed by gas phase deposition of amorphous SiO2. The final catalysts are used in their acid form.

Controlled desilication of zeolites have been described in the open literature and are known to generate additional mesoporosity within the zeolitic structure (Groen et al., Microporous and Mesoporous Materials 69 (2004, 29-34; Perez-Ramirez et al., Chemical Society Reviews 37 (2008) 2530-2542). WO2008/147190 describes a process for preparation of mesoporous mordenite zeolite by subjecting a non-dealuminated mordenite to an alkaline treatment in order to generate mesoporosity by removal of silicon.

It has now been found that zeolites which have been treated with an aqueous alkaline solution show improved catalyst lifetime and selectivity to diesel-range hydrocarbons when used as olefin oligomerization catalysts.

According to the present invention there is provided a process for producing a hydrocarbon fraction containing components boiling in the range typical for diesel fuel comprising contacting a feedstock comprising one or more $C_2$ to $C_{10}$ alkenes with a modified zeolite catalyst having a one-dimensional micropore structure consisting of channels made from rings containing between 8 and 12 silicon/aluminium atoms, at a temperature in the range 100 to 500° C. and pressure in the range 0.1 to 200 bar characterised in that the modified zeolite catalyst is one which has been prepared by treating a corresponding zeolite precursor with an alkaline solution.

The alkene feedstock employed in the process of the present invention comprises one or more $C_2$ to $C_{10}$ hydrocarbons preferably one or more $C_3$ to $C_7$ alkenes. These olefins can be used pure or in mixtures with more other components such as alkanes, e.g. n-propane, n-butane or n-pentane, or an inert gas, such as nitrogen. In such cases the alkenes should comprise between 10% and up to 100% by weight of the mixture preferably between 50% and up to 100%. The alkene feedstock can be derived from any source including crude oil, natural gas, bio-feedstocks and conversion technologies such as Fischer-Tropsch and other Gas to Liquids technologies. The feedstock may also desirably contain hydrogen preferably at a level of from 0.1 to 80 molar percent of the total feedstock, preferably in a range from 0.5 to 50 molar percent. In a preferred embodiment the feedstock may be at least partly derived from a refining process, e.g. the LPG product of a catalytic cracking process or the product of a Fischer-Tropsch unit or a biofuels processing unit or from a methanol to liquid hydrocarbons plant.

The oligomerization process itself is suitably carried out continuously either by passing the feedstock through a fixed bed of modified zeolite catalyst or by bring both the feedstock and modified zeolite catalyst together in a moving or fluidised bed. In the latter case the bed may also be configured to allow a continuous catalyst take-off and recycle for regeneration purposes. Suitably the oligomerization process is carried out at a temperature of from 100 to 500° C., preferably 120 to 400° C., especially 150 to 350° C. Suitably a pressure of from 0.1 to 200 bar, preferably 2 to 150 bar most preferably 5 to 80 bar may be used. The weight hourly space velocity WHSV of the feedstock over the zeolite catalyst is suitably in the range of 0.1-100 $h^{-1}$, preferably in the range of 0.5 to 50 $h^{-1}$ The hydrocarbon fraction produced by the process of the present invention will suitably comprise greater than 50% by weight preferably greater than 70% by weight of components boiling under atmospheric conditions in the range typical for diesel fuels (250 to 350° C.). The hydrocarbon fraction which is the product of the oligomerization process described herein may be subject to further downstream treatment e.g. fractional distillation to recover pure diesel fuel The zeolites which form the precursors to those modified zeolite catalysts used in the process of the present invention are those having a microporous structure comprised of ten or twelve ring channels. Suitable examples are those whose crystalline structure belongs to one of the following IUPAC framework types TON (Theta-1, Nu-10, ZSM-22, KZ-2; ISI-1), MTT (ZSM-23, EU-13, ISI-4, KZ-1), EUO (EU-1, TP2-3, ZSM-50) AEL (SAPO-11), FER (ferrierite, FU-9, Nu-23, ISI-6, ZSM-35), MFS (ZSM-57), ITH (ITQ-13), IMF (IM-5), MFI (ZSM-5) and MEL (ZSM-11) and ZSM-12. Further information on these structure types can be found in the Atlas of Zeolite Framework Types (C. Baerlocher, W. M. Meier, D. H., Olson, $5^{th}$ ed. Elsevier, Amsterdam, 2001) or the web-based version thereof. All the above-mentioned zeolites can be prepared by established methods known in the art. In a preferred embodiment of the invention the zeolite is of the TON structure type, most preferably the sub-types known in the art as Theta-1 and ZSM-22.

Typically the zeolite used has a silicon to aluminium ratio of between 15:1 and 250:1, preferably between 30:1 and 200:1 and most preferably between 45:1 and 150:1. Although the preferred catalytically active form of the modified zeolite catalyst is a hydrogen form, the modified zeolite catalyst of the present invention can in principle be wholly or partially converted into any other cationic form by conventional ion-exchange techniques. Such forms can in principle include any stable metal or organic cation but those of the Group IA and IIA metals, V, Cr, Mn, Fe, Co, Ni, Cu, Zn, Mo, W, Y Ti, Ga, the rare earths (e.g. Ce and La) and ammonium ion are preferred. Zeolite catalysts containing more than one cation can be created by sequential partial exchange or simultaneous exchange using a solution of more than one cation.

The modified zeolite catalyst is suitably prepared from the zeolite by contacting it with an aqueous alkaline solution at a pH at 25° C. in excess of 8 under conditions which will remove silicon from the structure and possibly dissolve any extraneous amorphous silica from the sample. In the case of TON zeolites it has been observed by electron microscopy that the effect of this treatment is also to introduce mesoporosity into the needle-like crystallites typically formed and to break them up into more fragments whose dimensions are more isotropic. This mesoporosity preferably has pore volumes in the range 0.09 to 0.25 $ml^3g^{-1}$ most preferably 0.12 to 0.25 $ml^3g^{-1}$ as measured by nitrogen absorption at 77° K and calculated on the basis of an analysis of the isotherms so obtained using the Barrett-Joyner-Halenda (BJH) method. Details of this method can be found in J. Amer. Chem. Soc. (1951) 73 373-380.

Typically the alkaline treatment is carried out by contacting the zeolite with an aqueous alkaline solution of one or more metal hydroxides, ammonium hydroxide, amines, phosphazenes, hydroxides of organic cations, pyridine, imidazole or quarternized amine hydroxides at a temperature in the range 20 to 250° C. preferably 30 to 150° C. most preferably 40 to 90° C. Where preferably an aqueous hydroxide solution is used, the concentration of hydroxide in this aqueous solution is less than 10M, preferably less than 5M most preferably in the range 0.01 to 2M. Most preferably the hydroxides used are sodium hydroxide, potassium hydroxide, ammonium hydroxide, magnesium hydroxide, calcium hydroxide and tetramethyl-, tetraethyl-, tetrapropyl- and tetrabutylammonium hydroxide.

In an embodiment of the present invention the zeolite is converted into a hydrogen form prior to treatment with the alkaline solution. In another the alkaline treatment is performed on a previously dealuminated zeolite in its hydrogen form. For these materials the dealumination may have been carried out by any of the techniques described in the state of the art, such as acid treatment, hydrothermal treatment or combinations thereof.

After treatment with the alkaline solution the modified zeolite catalyst can in a second stage be restored partially or completely to the hydrogen form by known techniques such as ion-exchange with a solution of an ammonium salt followed by calcination under standard conditions. If desired, the modified zeolite catalyst can also be treated before the second stage with a surface-modification agent such as a dicarboxylic acid, a bulky organic molecule, (see for example U.S. Pat. No. 4,520,221 and U.S. Pat. No. 4,568,786), such as collidine, or bulky chelating/sequestering agents such as aminocarboxylates (e.g. EDTA, diethylenetriamine pentaacetic acid, hydroxyethylethylene diamine triacetate) and aminophosphates or aminophosphonates (e.g. aminotrimethylene phosphate, ethylenediamine tetramethylene phosphonate) or a hexahalosilicate salt. The purpose of this surface modification agent which in its active form consists of anions too large to penetrate the micropores of the modified zeolite catalyst, is to remove aluminium from the exterior of the crystallites. Additionally the exterior surface of the modified zeolite catalyst can be passivated by selective coking.

If desired, the zeolite catalyst can also be treated after calcination with a surface-modification agent such as a dicarboxylic acid, a bulky organic molecule (see for example U.S. Pat. No. 4,520,221 and U.S. Pat. No. 4,568,786), such as collidine, or a bulky complexing agents such as EDTA. Additionally the exterior surface of the zeolite catalyst can be passivated by selective coking. In a preferred embodiment of the present invention the modified zeolite catalyst is treated with oxalic acid or a hexafluorosilicate salt before use.

If desired the modified zeolite catalyst can be formulated with a matrix of one or more metal oxides which are either amorphous or of low crystallinity. In such formulations the matrix may be selected from alumina, silica-alumina, silica, clays, oxides of magnesium, titanium boron, zirconium, vanadium, chromium, molybdenum, manganese, zinc, iron, nickel, cobalt, tungsten, antimony, ceria, lanthanum, and the other readily available rare earths as well as aluminium phosphates, zirconium phosphates, carbon, aluminates and combination of them. Preferably the matrix is comprised of the zeolite catalyst and at least one type of silica, silica/alumina or alumina, most preferably gamma-alumina. Binding agents typically used in the art can also additionally be employed.

The formulated modified zeolite catalyst can be formed into any shape useful for industrial-scale duty for example, extrudates, spheres, spray dried microspheres and the like.

Optionally, the modified zeolite catalyst may further comprise at least one other metal e.g. Ga, transition metal such as V, Cr, Mn, Group VIII metals, Cu, Zn, Mo, W, Y, Ti and the rare earths, preferably a Group VIII metal or combination of more than one of them. The incorporation of the Group VIII metal can be carried out by one or more steps of ion exchange, or by impregnation techniques such as the incipient wetness impregnation or in excess of the precursor's solution, all of them well known procedures described in the state of the art. Sources of the Group VIII metals include their corresponding nitrates, sulphates or halides.

According to the present invention the formulated modified zeolite catalyst may comprise additionally at least one promoting element, selected from phosphorus, boron and their combinations. This promoting element is preferably phosphorus. These promoting elements can be incorporated into the catalyst by any of the well known procedures in the art. In the case of phosphorus, orthophosphoric acid, $H_3PO_4$, is preferred.

Optionally the formulated modified zeolite catalyst described in the present invention can further comprise at least one halogen, preferable fluorine.

Typically a formulated modified zeolite catalyst will conform to the following specification referred to the total catalyst weight:
0.1 to 99 wt % of the modified zeolite catalyst;
0.1 to 99 wt % of matrix;
0 to 20% of a Group VIII metal.
In a preferred specification, the percentages will be:
0.5 to 90% of the modified zeolite catalyst;
0.1 to 75% of matrix;
0 to 10% of a Group VIII metal.
In a most preferred specification, the percentages will be:
0.5 to 80% of the modified zeolite catalyst;
0.1 to 60% of matrix;
0 to 5% of a Group VIII metal.

The formulated modified zeolite catalyst can optionally contain up to 30% preferably up to 20% of other promoters, binding agents and the like.

The present invention will now be further described with reference to the following figures and examples.

FIG. 1: shows the propylene conversion obtained with the zeolite catalysts described in Examples 1-2, tested as described in Examples 6-7, compared with that of the zeolite precursor H-THETA-1 (Si/Al=50) tested as described in Example 5.

Figure 2:
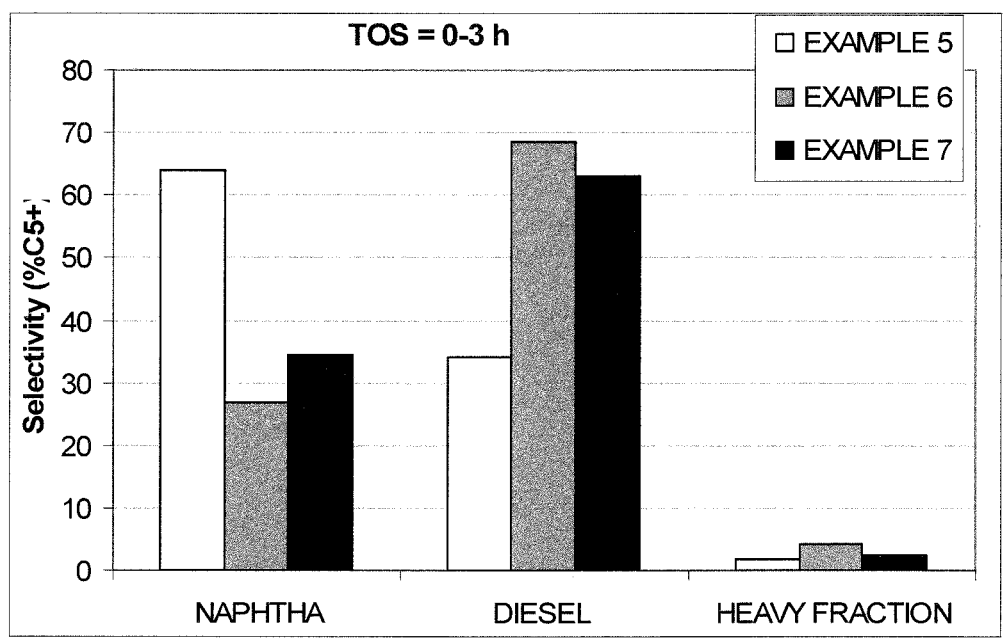

FIG. 2: shows the selectivity to different fractions in liquid products obtained with zeolites described in Examples 1-2, tested as described in Examples 6-7, compared with that of the zeolite precursor H-THETA-1 (Si/Al=50) tested as described in Example 5.

Figure 3:
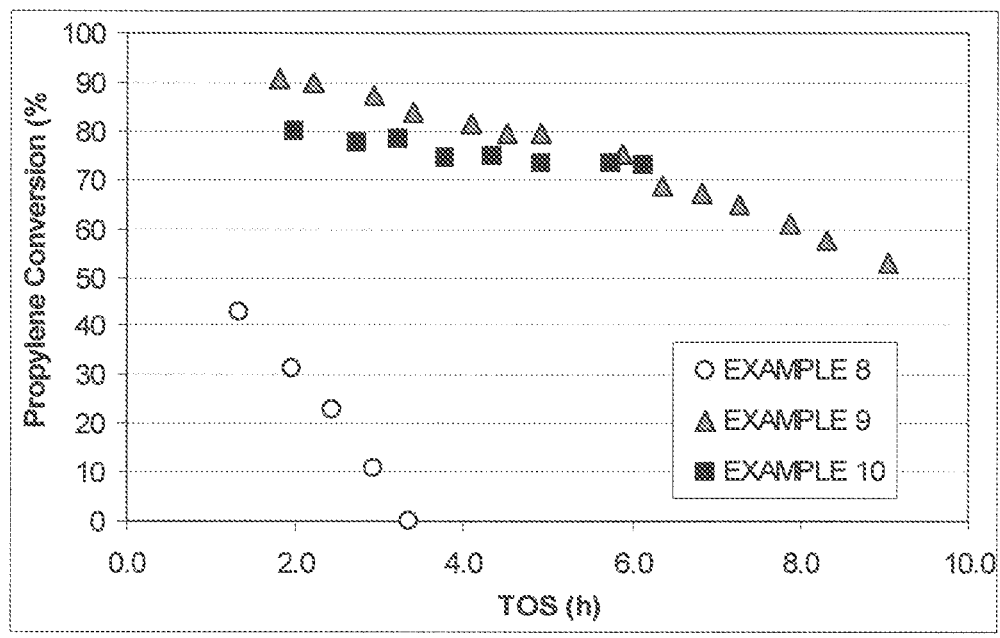

FIG. 3: shows the propylene conversion obtained with the zeolite catalysts described in Examples 3-4, tested as described in Examples 9-10, compared with that of the zeolite precursor H-THETA-1 (Si/Al=25) tested as described in Example 8.

Figure 4:
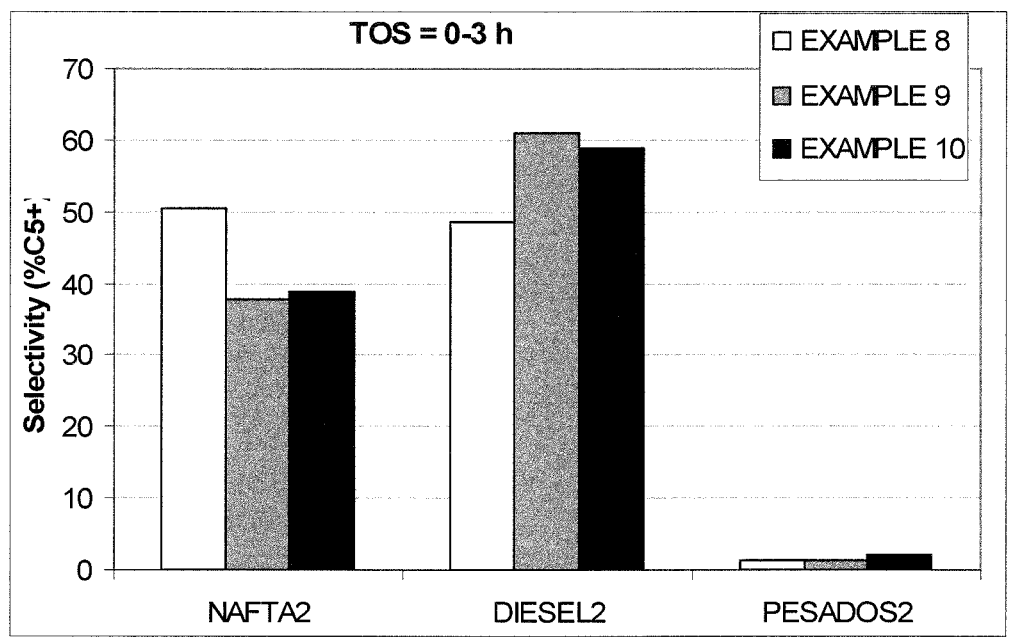

FIG. 4: shows the selectivity to different fractions in liquid products obtained with zeolite catalysts described in Examples 3-4, tested as described in Examples 9-10, compared with that of the zeolite precursor H-THETA-1 (Si/Al=25) tested as described in Example 8.

EXAMPLE 1

3 g of a THETA-1 zeolite in its hydrogen form (H-THETA-1, Si/Al=50) was suspended in 100 ml of a 0.2M sodium hydroxide aqueous solution and vigorously stirred for 30 min at 80° C. The reaction was then quenched by cooling down in an ice bath. The remaining solid was separated by filtration, washed with distillate water and dried overnight at 100° C. The alkaline treated THETA-1 was then converted to its acid form by three consecutive exchanges with a 0.1 M $NH_4NO_3$ solution at 83° C. for 2 hours and using a weight ratio of solution to solid of 20. Finally the sample is calcined for 5 hours at 450° C. This modified zeolite catalyst showed significant mesoporosity when studied by transmission electron microscopy and measured by nitrogen adsorption (77° K) and the BJH method ($V_{mesopore}$0.107 $cm^3g^{-1}$).

EXAMPLE 2

3 g of a THETA-1 zeolite in its hydrogen form (H-THETA-1, Si/Al=50) was suspended in 100 ml of a 0.2M sodium hydroxide aqueous solution and vigorously stirred for 30 min at 85° C. Then the reaction was quenched by cooling down in an ice bath. The remaining solid was separated by filtration, washed with distillate water and dried overnight at 100° C. The alkaline treated THETA-1 was next suspended in a 2.0M aqueous solution of oxalic acid (solution/solid ratio of 10 wt/wt) and stirred for 2 hours at 70° C. The solid was separated by filtration, washed with distillate water and dried overnight at 100° C. Finally the sample was calcined for 3 hours at 375° C. This modified zeolite catalyst showed mesoporosity when studied by transmission electron microscopy and measured by nitrogen adsorption (77° K) and the BJH method ($V_{mesopore}$0.117 $cm^3g^{-1}$).

EXAMPLE 3

3 g of a THETA-1 zeolite in its hydrogen form (H-THETA-1, Si/Al=25) was suspended in 100 ml of a 0.2M sodium hydroxide aqueous solution and vigorously stirred for 30 min at 85° C. The reaction was then quenched by cooling down in an ice bath. The remaining solid was separated by filtration, washed with distillate water and dried overnight at 100° C. The alkaline treated THETA-1 was next converted to its acid form by three consecutive exchanges with a 0.1 M $NH_4NO_3$ solution at 80° C. for 2 hours and using a weight ratio of solution to solid of 20. Finally the sample was calcined for 5 hours at 450° C. This modified zeolite catalyst showed mesoporosity when studied by transmission electron microscopy and measured by nitrogen adsorption (77° K) and the BJH method ($V_{mesopore}$0.067 $cm^3g^{-1}$).

EXAMPLE 4

H-THETA-1 zeolite (Si/Al=25) was refluxed for 1 hour at room temperature in a 16.5 M Hydrochloric acid solution, using a solution/solid weight ratio of 67.3 g of the dealuminated THETA-1 zeolite was then suspended in 100 ml of a 1M sodium hydroxide aqueous solution and vigorously stirred for 30 min at 80° C. The reaction was then quenched by cooling down in an ice bath. The remaining solid was next separated by filtration, washed with distillate water and dried overnight at 100° C. The alkaline treated THETA-1 was then converted to its acid form by three consecutive exchanges with a 0.1 M $NH_4NO_3$ solution at 80° C. for 2 hours and using a weight ratio of solution to solid of 20. Finally the sample was calcined for 5 hours at 450° C. This modified zeolite catalyst showed significant mesoporosity when studied by transmission electron microscopy and measured by nitrogen adsorption (77° K) and the BJH method ($V_{mesopore}$0.092 $cm^3g^{-1}$).

EXAMPLE 5

Comparative

THETA-1 zeolite in its hydrogen form (H-THETA-1, Si/Al=50) was pelletized, crushed and sieved to a particle size of 0.2-0.4 mm. 0.5 g of this pelletized sample were diluted with silicon carbide (0.64 mm-0.25 mm) to obtain a bed volume of 4.0 $cm^3$. The mixture was loaded into a down-flow stainless steel fixed bed reactor. A $C3^=$:C3 (propylene/propane) feedstock (60:40 wt:wt) was then fed to the reactor as a liquid by means of a Gilson piston pump. During the reaction, the pressure was controlled electronically through a Badger pneumatic valve. The temperature in the catalyst bed was controlled electronically by means of two independent heating zones with the corresponding thermocouples properly placed inside the catalytic bed. Oligomerization experiments were carried out at 200° C., 40 bar pressure and an alkene WHSV=6 h$^{-1}$ Variation of propylene conversion with time on stream (TOS) is presented in FIG. 1. The selectivity to different fractions in the liquid product recovered at the outlet of the reactor during the first three hours TOS is enclosed in FIG. 2.

EXAMPLE 6

The alkaline treated zeolite prepared as described in Example 1 was pelletized, crushed and sieved to a particle size of 0.2-0.4 mm. 0.5 g of this pelletized sample were diluted with silicon carbide (0.64 mm-0.25 mm) to obtain a bed volume of 4.0 cm$^3$. The mixture was then loaded into a down-flow stainless steel fixed bed reactor, and a C3$^-$:C3 feedstock (60:40 wt:wt) processed as described in Example 5. Variation of propylene conversion with time on stream (TOS) is compared with that of hydrogen form of the zeolite precursor in FIG. 1. It can be seen that not only is the initial activity greatly improved, but also the deactivation rate is decreased as compared to the hydrogen form. The selectivity to different fractions in the liquid product recovered at the outlet of the reactor during the first three hours TOS is shown in FIG. 2. This reveals that the selectivity to diesel in these experimental conditions is doubled as compared to the zeolite precursor.

EXAMPLE 7

The alkaline treated zeolite prepared as described in Example 2 was pelletized, crushed and sieved to a particle size of 0.2-0.4 mm. 0.5 g of this pelletized sample was diluted with silicon carbide (0.64 mm-0.25 mm) to obtain a bed volume of 4.0 cm$^3$. The mixture was then loaded into a down-flow stainless steel fixed bed reactor, and a C3$^-$:C3 feedstock (60:40 wt:wt) processed as described in Example 5. Variation of propylene conversion with time on stream (TOS) is compared with that of the hydrogen form of the zeolite precursor in FIG. 1. It can be seen that the initial activity is increased to values close to 95% and, moreover, no deactivation is observed along the 8 hours TOS. The selectivity to different fractions in the liquid product recovered at the outlet of the reactor during the first three hours TOS is shown in FIG. 2. The selectivity to the desired diesel fraction is increased almost 30 points.

EXAMPLE 8

Comparative

A THETA-1 zeolite sample in its hydrogen form (H-THETA-1, Si/Al=25) was pelletized, crushed and sieved to a particle size of 0.2-0.4 mm. 0.5 g of this pelletized sample were diluted with silicon carbide (0.64 mm-0.25 mm) to obtain a bed volume of 4.0 cm$^3$. The mixture was then loaded into a down-flow stainless steel fixed bed reactor, and a C3$^-$:C3 feedstock (60:40 wt:wt) processed as described in Example 5.
Variation of propylene conversion with time on stream (TOS) is compared with that other zeolite catalysts in FIG. 3. The selectivity to different fractions in the liquid product recovered at the outlet of the reactor during the first three hours TOS is shown in FIG. 4.

EXAMPLE 9

The alkaline treated zeolite prepared as described in Example 3 was pelletized, crushed and sieved to a particle size of 0.2-0.4 mm. 0.5 g of this pelletized sample were diluted with silicon carbide (0.64 mm-0.25 mm) to obtain a bed volume of 4.0 cm$^3$. The mixture was then loaded into a down-flow stainless steel fixed bed reactor, and a C3$^-$:C3 feedstock (60:40 wt:wt) processed as described in Example 5. Variation of propylene conversion with time on stream (TOS) is compared with that of the zeolite precursor in FIG. 3. It can be seen that not only is the initial activity greatly improved, but also the deactivation rate is decreased as compared to the hydrogen form of the zeolite precursor. The selectivity to different fractions in the liquid product recovered at the outlet of the reactor during the first three hours TOS is shown in FIG. 4.

EXAMPLE 10

The alkaline treated zeolite prepared as described in Example 4 was pelletized, crushed and sieved to a particle size of 0.2-0.4 mm 0.5 g of this pelletized sample were diluted with silicon carbide (0.64 mm-0.25 mm) to obtain a bed volume of 4.0 cm$^3$. The mixture was then loaded into a down-flow stainless steel fixed bed reactor, and a C3$^-$:C3 feedstock (60:40 wt:wt) processed as described in Example 5.
Variation of propylene conversion with time on stream (TOS) is compared with that of the hydrogen form of the zeolite precursor in FIG. 3. It can be seen that not only is the initial activity greatly improved, but also the deactivation rate is decreased as compared to the hydrogen form. The selectivity to different fractions in the liquid product recovered at the outlet of the reactor during the first three hours TOS is shown in FIG. 4. There it is shown that the selectivity to diesel in these experimental conditions is considerably increased as compared to the hydrogen form of the zeolite precursor.

The invention claimed is:
1. A process for producing a hydrocarbon fraction containing components boiling in the range typical for diesel fuel comprising contacting a feedstock comprising one or more C$_2$ to C$_{10}$ alkenes with a modified zeolite catalyst having a one-dimensional micropore structure consisting of channels made from rings containing between 8 and 12 silicon and/or aluminum atoms at a temperature in the range 100 to 500° C. and pressure in the range 0.1 to 200 bar characterised in that the modified zeolite catalyst is one which has been prepared by treating a corresponding zeolite precursor with an alkaline solution under conditions which will remove silicon from the structure and the corresponding zeolite is a TON zeolite; and
producing diesel fuel from the hydrocarbon fraction;
wherein the alkaline solution is an aqueous hydroxide solution selected from the group consisting of sodium hydroxide, potassium hydroxide, ammonium hydroxide, magnesium hydroxide, calcium hydroxide and tetramethyl-, tetraethyl-, tetrapropyl- and tetrabutylammonium hydroxide, and wherein the conversion of the feedstock to diesel fuel is greater than the conversion of the feedstock to diesel fuel with the TON zeolite that is not treated with an alkaline solution and conducted at the same temperature and pressure.
2. A process according to claim 1, where the feedstock comprises one or more C$_3$ to C$_7$ alkenes.
3. A process according to claim 2, where the alkene is present in the feed in a concentration of from 50 to 100% by weight.
4. A process according to claim 1 wherein the feedstock may be at least partly derived from a refining process.
5. A process according to claim 1 wherein the alkaline solution is an aqueous potassium or sodium hydroxide solution.

6. A process according to claim 1 wherein the zeolite precursor is dealuminated before treatment with the alkaline solution.

7. A process according to claim 6 wherein the alkaline solution treatment is performed on the dealuminated zeolite in its hydrogen form.

8. A process according to claim 1 or claim 6 wherein the zeolite is converted back to the hydrogen form after treatment with the alkaline solution.

9. A process according to claim 1 or claim 6 wherein the modified zeolite catalyst has been treated with oxalic acid or a hexahalosilicate salt.

10. A process according to claim 1 carried out at a temperature from 150 to 300° C., a pressure from 2 to 80 bar and a weight hourly space velocity of from 0.1 to 100 $h^{-1}$.

11. A process according to claim 1 wherein the feedstock contains from 0.1 to 20 mole percent hydrogen.

12. A process according to claim 1 wherein the modified zeolite catalyst has been prepared by treating the corresponding zeolite precursor with the alkaline solution under conditions which dissolve any extraneous amorphous silica from the zeolite precursor.

\* \* \* \* \*